US012694706B1

(12) United States Patent
Moffatt

(10) Patent No.: US 12,694,706 B1
(45) Date of Patent: Jul. 28, 2026

(54) FISH IDENTIFICATION APPARATUS AND METHOD

(71) Applicant: Brian Patrick Moffatt, Hobe Sound, FL (US)

(72) Inventor: Brian Patrick Moffatt, Hobe Sound, FL (US)

( * ) Notice: Subject to any disclaimer, the term of this patent is extended or adjusted under 35 U.S.C. 154(b) by 314 days.

(21) Appl. No.: 18/380,872

(22) Filed: Oct. 17, 2023

Related U.S. Application Data

(60) Provisional application No. 63/379,895, filed on Oct. 17, 2022.

(51) Int. Cl.
  *G06V 40/10* (2022.01)
  *G06V 20/05* (2022.01)

(52) U.S. Cl.
  CPC .............. *G06V 40/10* (2022.01); *G06V 20/05* (2022.01)

(58) Field of Classification Search
  CPC ............................... G06V 40/10; G06V 20/05
  See application file for complete search history.

(56) References Cited

U.S. PATENT DOCUMENTS

| | | | | |
|---|---|---|---|---|
| 2004/0220856 A1* | 11/2004 | Moore | ............... | G06Q 30/0251 705/14.23 |
| 2009/0141939 A1* | 6/2009 | Chambers | ........ | G08B 13/19613 382/103 |

| | | | | |
|---|---|---|---|---|
| 2016/0278360 A1* | 9/2016 | Battah | .................... | A01K 97/20 |
| 2019/0000049 A1* | 1/2019 | Bonutti | .................. | A01K 73/10 |
| 2020/0256967 A1* | 8/2020 | Wigh | ...................... | G01S 7/521 |
| 2021/0142052 A1* | 5/2021 | James | ................... | A01K 61/95 |
| 2021/0289759 A1* | 9/2021 | Naval, Jr. | ............. | G06V 20/05 |
| 2024/0103163 A1* | 3/2024 | Wada | ...................... | G01S 7/539 |
| 2025/0315981 A1* | 10/2025 | Kastner | .................. | G06T 7/521 |

FOREIGN PATENT DOCUMENTS

| | | | | |
|---|---|---|---|---|
| WO | WO-2016141440 A1 * | 9/2016 | ............. | G03B 17/08 |

* cited by examiner

*Primary Examiner* — Ming Y Hon
(74) *Attorney, Agent, or Firm* — Gulf Coast Intellectual Property Group

(57) ABSTRACT

A fish detection system that is deployed behind a vessel and is trolled therebehind wherein the invention provides surveillance, tracking and identification of marine species. The invention includes a species database having a multitude of frames of video footage wherein the video footage has had the grid cell structure thereof analyzed. The video data within the species database is subjected to data augmentation and data optimization. A camera captures a live video stream sourced from behind a vessel in motion wherein the live video stream is analyzed utilizing the metrics and images from the species database. The fish identification system provides elimination of baitfish and baitfish rigs from the video stream. Detection of a marine species occurs and subject to detection the marine species is tracked and surrounded by bounding boxes while all other image data is rejected. Notification of the identified marine species is provided both visually and audially.

14 Claims, 4 Drawing Sheets

FISH IDENTIFICATION APPARATUS AND METHOD

PRIORITY UNDER 35 U.S.C SECTION 119(e) & 37 C.F.R. SECTION 1.78

This nonprovisional application claims priority based upon the following prior U.S. Provisional Patent Application entitled: Fish detection and recognition system with underwater camera and live video, Application No. 63/379,895 filed Oct. 17, 2022, in the name of Brian Patrick Moffatt, which is hereby incorporated by reference for all purposes.

FIELD OF THE INVENTION

The present invention relates generally to fishing equipment, more specifically but not by way of limitation, a fish identification system that is configured to be trolled behind a boat wherein the present invention includes image capture equipment and a database wherein the present invention is operable to analyze captured images and provide identification to users what type of fish is present behind the boat in which the present invention is deployed.

BACKGROUND

Millions of people participate in fishing on a daily basis in the United States and other parts of the world. Individuals engage in fishing either for a commercial or recreational purpose. Fishing is executed employing numerous alternate techniques such as but not limited to bottom fishing and trolling. The former is a technique that is often deployed proximate a structure located on the bottom and is typically performed with the boat at anchor.

Trolling is a type of fishing technique that is commonly performed offshore and involves dragging a collection of bait known as a spread. Trolling is a common type of fishing technique that is utilized for species such as but not limited to pelagic species. During trolling for fish, a spread is towed behind the boat and various baits are deployed in order to facilitate attraction and capture of a fish. As the spread is deployed in the propeller wash of the boat, it can be difficult to see from the surface is a fish is following the bait and further what type of fish is following the bait. Identification of marine species amidst a background of turbulent water and varying light is difficult. Additionally, the baits of a spread are typically at different distances from the boat which can make it difficult for individuals on the boat to identify a type of fish that is following the bait.

Accordingly, there is a need for a fish identification system that is configured to be trolled behind a boat wherein the present invention includes equipment to facilitate video capture of fish and wherein the present invention further includes imagery analysis wherein the present invention analyzes captured video image to identify types of fish and further provide notification thereof.

SUMMARY OF THE INVENTION

It is the object of the present invention to provide a fish identification system and method wherein the present invention is deployed behind a boat in motion wherein the present invention includes a camera assembly that includes a camera boom and a camera.

Another object of the present invention is to provide a fish identification system that has a portion thereof configured to be trolled behind a boat wherein the camera assembly is operably coupled to at least one display monitor.

A further object of the present invention is to provide a fish identification system and method wherein the present invention is deployed behind a boat in motion wherein the present invention includes a method of real time object analysis of captured video image from the camera assembly wherein the analysis provides determination of the type of fish in the captured images.

Yet a further object of the present invention is to provide a fish identification system that has a portion thereof configured to be trolled behind a boat wherein the camera assembly includes a camera housing that is configured to maintain the camera at a desired depth during trolling.

Still another object of the present invention is to provide a fish identification system and method wherein the present invention is deployed behind a boat in motion wherein the present invention provides an audio alert upon the detection of a fish by the camera assembly.

An additional object of the present invention is to provide a fish identification system that has a portion thereof configured to be trolled behind a boat wherein the present invention includes an ability to deploy more than one camera and provide capture and analysis of the video images therefrom simultaneously.

Yet a further object of the present invention is to provide a fish identification system and method wherein the present invention is deployed behind a boat in motion wherein the present invention is configured to integrate into existing electronic displays.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
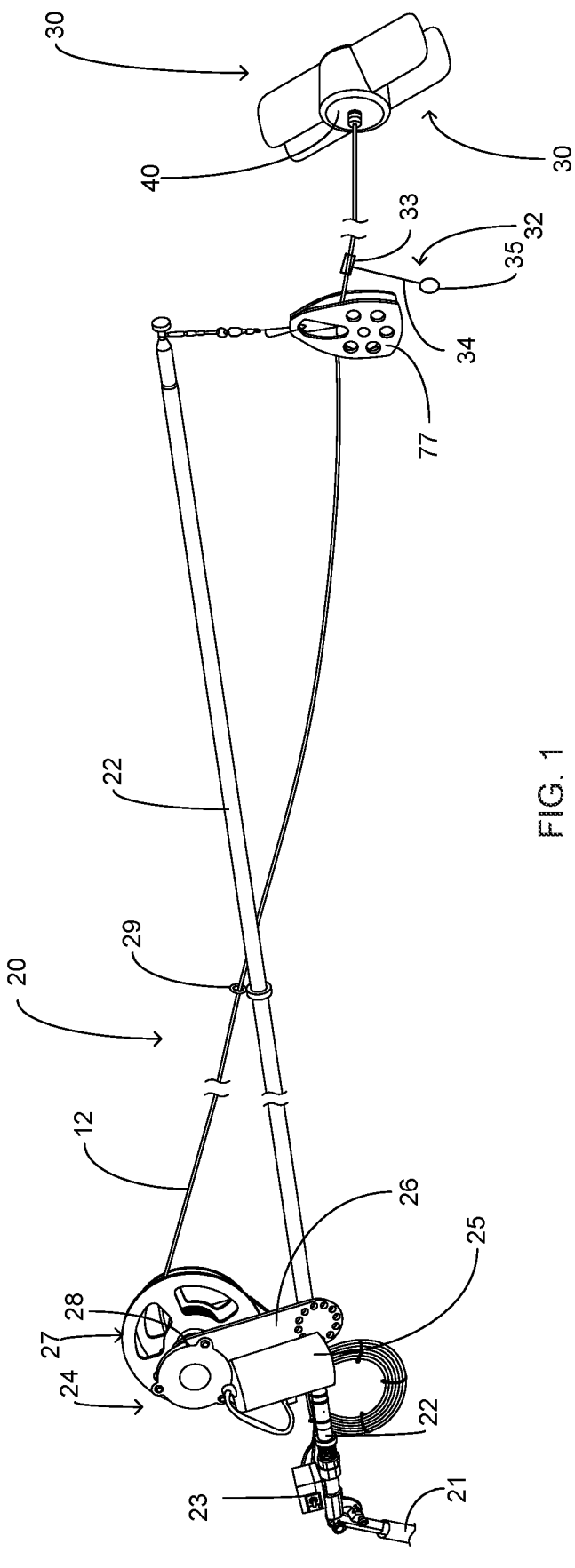
FIG. 1 is a perspective view of the camera mounting member of the present invention.
Figure 2:
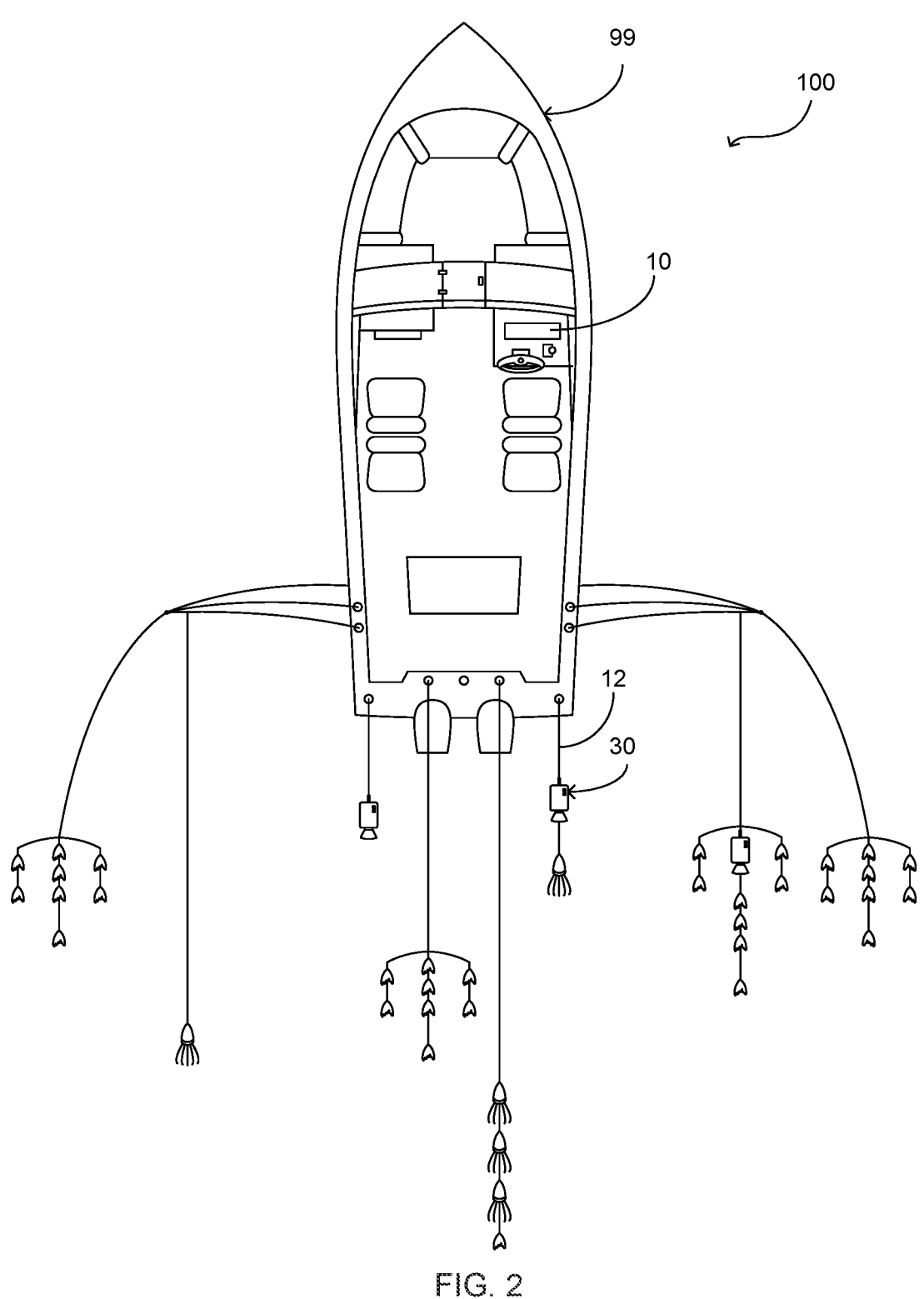
FIG. 2 is a diagrammatic view of a bait spread having the present invention as a part thereof.
Figure 3:
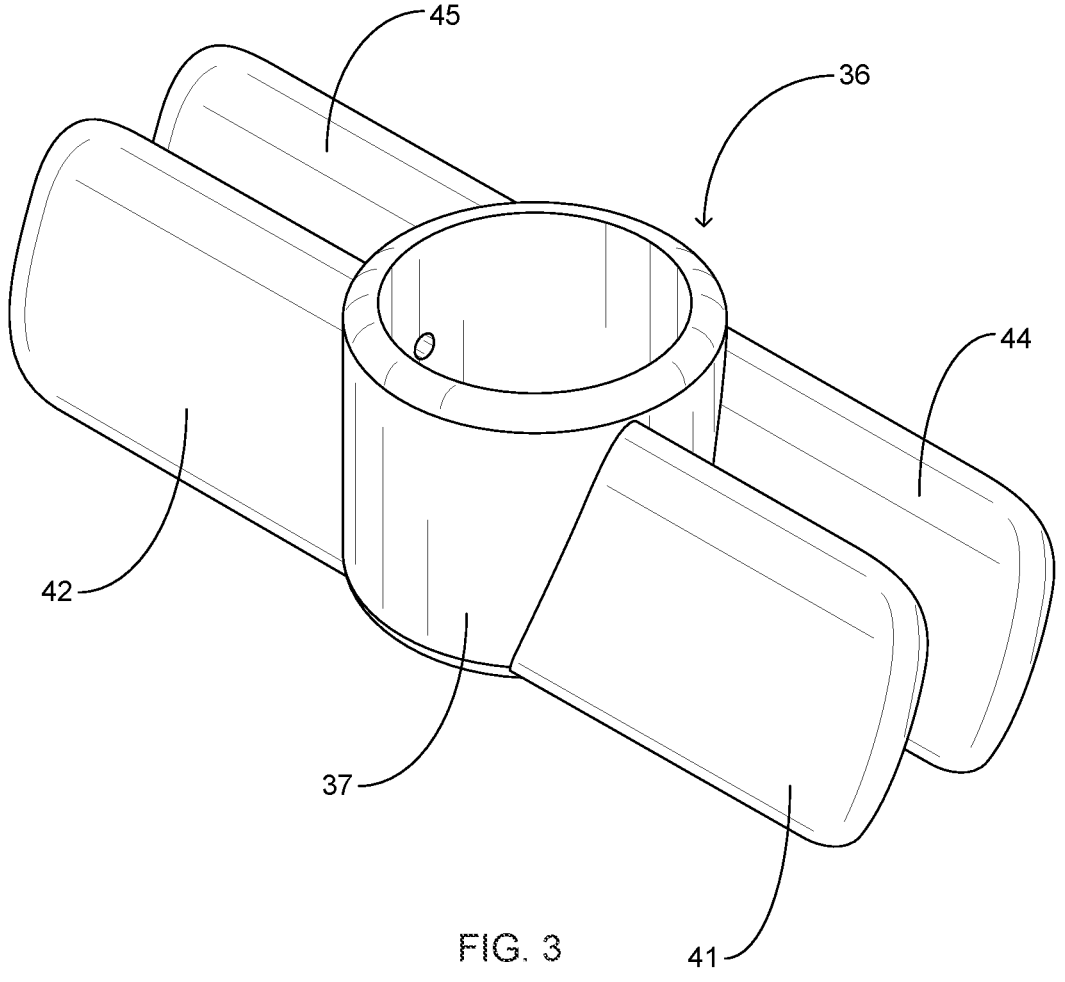
FIG. 3 is a detailed view of the camera housing of the camera assembly.

Referring now to the drawings submitted herewith, wherein various elements depicted therein are not necessarily drawn to scale and wherein through the views and figures like elements are referenced with identical reference numerals, there is illustrated a fish identification system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the fish identification system 100 includes a graphical display unit 10, camera mounting member 20 and camera assembly 30. As is further discussed herein, the present invention additionally includes a real time analysis of underwater videography that provides recognition and detection of fish species present behind the marine vessel that is equipped with the present invention. The fish identification system 100 includes hardware components that are discussed first herein wherein it should be understood within the scope of the present invention that the hardware components could be provided in alternate embodiments in order to achieve the desired objective.

The fish identification system 100 includes a graphical display unit 10. The graphical display unit 10 can be located at the helm of the vessel 99 and is a conventional graphical display unit that is capable of displaying video images. It should be understood within the scope of the present invention that the fish identification system 100 could employ a separate dedicated graphical display unit 10 or be operably coupled to a conventional graphics module already present on the vessel 99 utilizing suitable protocols. It is further contemplated within the scope of the present invention that a smart phone having an application downloaded thereto could be employed for operation and use of the fish identification system 100. The graphical display unit 10 is operably coupled to camera assembly 30 employing cable 12. The cable 12 is operably coupled to the camera mounting member 20. The camera mounting member 20 and the components thereof provide the ability to control the length of the cable 12 deployed behind the vessel 99 and the position of the camera assembly 30. The camera mounting member 20 includes base member 21 wherein the base member 21 is cylindrical in shape being manufactured from a rigid material such as but not limited to aluminum and is configured to journaled into conventional rod holder typically present in the gunwale of a vessel. It should be understood within the scope of the present invention that the base member 21 could be provided in various alternate lengths and diameters.

A support member 22 is operably coupled to the base member 21 and extends outward therefrom. The support member 22 is manufactured from a suitable rigid material and provides the necessary support for controller 23. The support member 22 is coupled to the base member 21 so as to provide angular adjustment thereof. Controller 23 is operably coupled to the motor assembly 24 and includes the necessary electronics that enables operation of the motor assembly 24. The motor assembly 24 includes motor 25, motor bracket 26, cable spool 27 and cable spool mount 28. The motor 25 is mounted to the motor bracket 26 employing suitable techniques such as but not limited to mechanical fasteners. The motor bracket 26 extends upward from the support member 22. The motor 25 is mounted adjacent a first side of the motor bracket 26. Mounted opposite the motor 25 is the cable spool mount 28. The cable spool mount 28 is a square U-shaped mount that provides rotatable mounting of the cable spool 27. The motor 25 is operably coupled to the cable spool 27 and is configured to provide rotational movement thereof in both a clockwise and counterclockwise direction so as to deploy or retrieve the cable 12 wound around the cable spool 27. The cable 12 extends outward along support member 22 being supported by loop members 29 and is operably engaged with pulley member 77 that is suspendedly mounted to the distal end of the support member 22.

The cable 12 has operably coupled thereto beyond the support member 22 weight suspension member 32. The weight suspension members 32 include clamp member 33 that is surroundably mounted to the cable 12 from which a support cable 34 is connected thereto. The support cable 34 includes loop 35 wherein various elements such as but not limited to weights can be operably coupled thereto. The weight suspension members 32 are employed to assist in lowering the camera assembly 30 to the desired depth. It should be understood within the scope of the present invention that the cable 12 could have various quantities of weight suspension members 32. The camera assembly 30 is operably coupled to the end of the cable 12. The camera assembly 30 includes housing 36 wherein the housing 36 includes central portion 37. The central portion 37 is annular in shape being hollow so as to provide mounting of a camera 40 therein. Integrally formed with the central portion 37 is a first upper lateral wing member 41 and a second upper lateral wing member 42. The first upper lateral wing member 41 and second upper lateral wing member 42 extend outward from opposing sides of the central portion 37. A first lower lateral wing member 44 and a second lower lateral wing member 45 are integrally formed with the central portion 37 and extend outward from opposing sides thereof. The first upper lateral wing member 41, second upper lateral wing member 42, first lower lateral wing member 44 and second lower lateral wing member 45 are parallel with each other having a void therebetween. The first upper lateral wing member 41, second upper lateral wing member 42, first lower lateral wing member 44 and second lower lateral wing member 45 are integrally formed with the central portion 37 so as to have a downward angle wherein the leading edges thereof a position lower than the rear edges. The downward angle of the first upper lateral wing member 41, second upper lateral wing member 42, first lower lateral wing member 44 and second lower lateral wing member 45 provides a technique to ensure the camera assembly has the proper attitude when being trolled through the water by the vessel 99.

Figure 4:
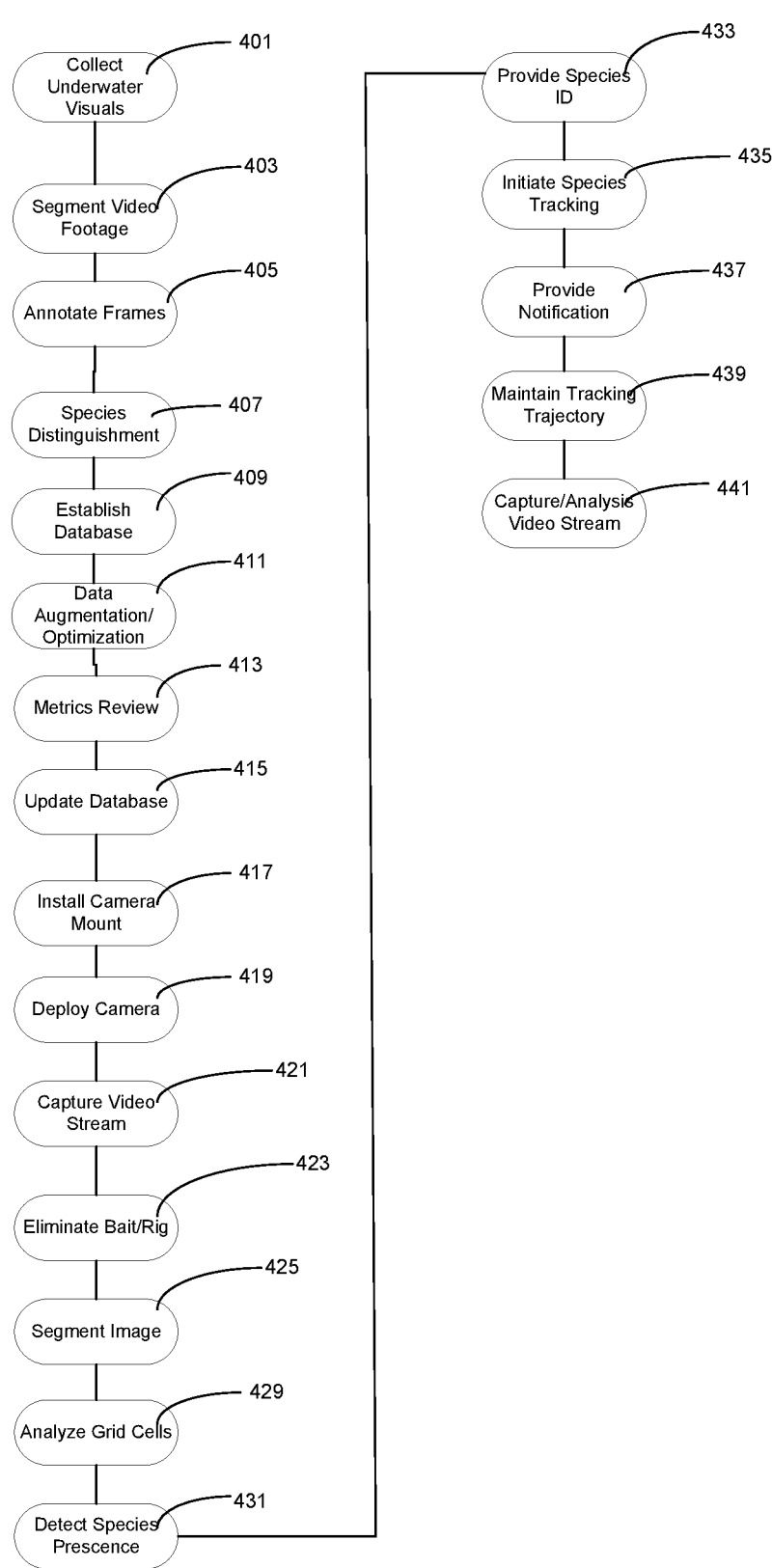
FIG. 4 is an outline of the method of the present invention.

Referring now in particular to FIG. 4 submitted as a part hereof, the method of the fish identification system 100 is outlined therein. In step 401, a collection of underwater video footage of marine species is acquired. It should be understood within the scope of the present invention that the collection of underwater video footage can be acquired through capture by a user of the present invention or acquired through additional channels. In a preferred embodiment of the present invention, the collection of underwater video footage includes species such as but not limited to pelagic fish species. Step 403, all of the acquired and retained video footage is segmented into frames at a frequency of five to ten frames per second. It should be understood within the scope of the present invention that the segmentation could be performed at alternate frame per second rates. In step 405, each frame of the captured video footage undergoes annotation wherein the objective of the annotation of the frames is to establish distinguishment of baitfish and rigs from a desired targeted species. It should be understood within the scope of the present invention that baitfish incorporates multiple types of baitfish species commonly deployed in offshore fishing. As each frame is annotated, the baitfish types are distinctly labeled. In step 407, the software of the present invention provides species distinguishment for the types of targeted fish. Each frame undergoes an analysis and targeted fish species are identified and labeled. Step 409, a species database is established with the analyzed video footage is stored therein wherein the analyzed video footage includes identified baitfish and fish species each having a distinct identification assigned thereto.

In step 411, the stored video footage in the species database undergoes data augmentation and data optimization. In this step the captured video footage in the species database is segmented in grids wherein each grid has bounding box specifications assigned thereto. As is known in the art bounding box specifications are represented by four values of X, Y, W and H. X and Y denote the coordinates of the center of the bounding box relative to the entire image while W and H represent the width and height of the bounding box relative to the entire image. Detection of a marine species occurs and subject to detection the marine species is tracked and surrounded by bounding boxes while all other image data is rejected. The software of the present invention facilitates grid enhancement wherein each grid has the pixels therein augmented and optimized. It should be understood within the scope of the present invention that data augmentation and optimization could include but is not limited to: geometric transformations, wherein the grids can cropped, rotated, translated or inverted to provide an improvement in the graphic quality; color space transformations, wherein the grids can have the RGB color channels altered and further provide intensification of any color present in the grid; kernel filtration, wherein the image in the grid can be either sharpened or blurred; random erasing, wherein any portion of the original image can be deleted and mixing of images from other grids of captured video footage. In step 413, the metrics of performance of the video footage in the species database is reviewed. Metrics such as but not limited to accuracy, precision and recall are reviewed for the video footage in the species database. Step 415, the species database is continuously updated with additional video footage and undergoes continual data augmentation and data optimization as discussed herein.

In step 417, the camera mounting member 20 is deployed and mounted to a vessel 99. It should be understood within the scope of the present invention that the camera mounting member 20 is operably coupled to a graphical display unit 10 or other suitable computing device in preparation for use and operation of the fish identification system. Step 419 the camera assembly 30 is deployed behind the vessel 99 and towed therebehind. In step 421, initiation of video capture commences wherein the camera 40 provides a live stream video wherein the video is displayed on an operably coupled graphical display unit. Step 423, the software of the present invention provides elimination of the images of the bait and or bait rigs wherein the elimination of those images is based upon stored images from the species database development. In step 425, the video stream from the deployed camera 40 undergoes segmenting wherein the video stream is segmented at a desired frames per second rate. Step 429, the software of the present invention facilitates analysis of the grids of the video stream wherein the grids are compared to grids of the species database. In step 431, the detection of a species is determined by the software of the present invention wherein the compilation of the analyzed grids of the video footage have a marine species detected therein. Step 433, the software of the present invention generates species identification based on comparison of the video in the video stream and the video data in the species database. In step 435, the fish identification system 100 initiates tracking of the identified species in the video stream being generated by the camera 40 that is being trolled behind the vessel 99. Step 437, the fish identification system 100 provides an alert notification to the users thereof on the vessel 99 that a marine species has been detected. It should be understood within the scope of the present invention that the alert notification could be visual and/or audio and wherein the alert notification includes the species type identified. In step 439, the tracking trajectory of the identified marine species is determined and the software of the present invention maintains video capture of the marine species along it tracking trajectory. The software of the present invention employs appearance driven attributes and motion-oriented signals detected within the grid analysis of the frames of the video stream so as to facilitate surveillance and tracking of the marine species following the vessel 99 in the field of view of the camera 40. The software application of the fish identification system is programmed to identify multiple objects in each frame of data and assign an identity thereto matching those identities in subsequent frames as well as matching the identity to those in the species database. In step 441, the fish identification system 100 provides continuous capture and analysis of the video stream from the camera 40 executing the operations as described herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A fish identification method that is configured to be deployed behind a marine vessel wherein the fish identification method comprises the steps of:

collecting a multitude of underwater visual video footage, wherein the underwater visual video footage includes images of fish species;

analyzing the underwater visual video footage, wherein the underwater visual video footage is analyzed for fish species identification;

distinguishing the fish species identification;

storing the fish species identification in a database, wherein the fish species identification is labeled in the database;

mounting a camera assembly to the marine vessel, wherein the camera assembly is mounted to the marine vessel utilizing a camera mount;

deploying the camera assembly into water behind the vessel, wherein the camera assembly includes a camera operably coupled to a housing;

towing the camera assembly behind the vessel;

capturing a video data, wherein the camera is employed to capture video feed of the area of water behind the vessel;

analyzing the video data, wherein the video data captured by the camera is continuously analyzed;

identifying a presence of at least one fish, wherein the at least one fish is captured in the video data from the camera assembly;

comparing the video data of the at least one fish to the database;

establishing an identity of the at least one fish, wherein the data comparison of the video data with the fish species identification confirms an identity of the at least one fish;

providing a notification to a user of the presence of the at least one fish, wherein the notification provides the confirmation of the identity of the species of the at least one fish in the video data;

tracking the at least one fish, wherein the at least one fish is tracked in the video data;

augmenting the underwater visual video footage, wherein the underwater visual video footage is augmented and optimized prior to storing in the database;

providing identification of a plurality of types of baitfish and baitfish rigs, wherein video data of baitfish and baitfish rigs is stored in the database;

eliminating video data of baitfish and baitfish rigs from the video data captured by the camera.

2. The fish identification method that is configured to be deployed behind the marine vessel as recited in claim 1, and further including a step of segmenting the underwater visual video footage, wherein the underwater visual video footage is segmented at a rate of approximately five to ten frames per second.

3. The fish identification method that is configured to be deployed behind the marine vessel as recited in claim 2, and further including a step of establishing a grid structure of the underwater visual video footage, wherein the grid structure is analyzed and annotated for fish species identification.

4. The fish identification method that is configured to be deployed behind the marine vessel as recited in claim 3, wherein the camera housing includes a central portion having a first upper lateral wing member and a second upper lateral wing member, said camera housing further having a first lower lateral wing member and a second lower lateral wing member.

5. The fish identification method that is configured to be deployed behind the marine vessel as recited in claim 4, and further including a step of displaying the video data on a graphical display unit.

6. The fish identification method that is configured to be deployed behind the marine vessel as recited in claim 5, wherein the camera mount further includes a controller, said controller configured to operate a cable spool, said cable spool having a video data cable stored thereon, wherein the video data cable is operably coupled to the camera.

7. The fish identification method that is configured to be deployed behind the marine vessel as recited in claim 6, and further including a step of surrounding the at least one fish present in the video data from the camera with bounding boxes.

8. A method of identifying fish behind a marine vessel wherein the method comprises the steps of:

collecting a multitude of underwater visual video footage, wherein the underwater visual video footage includes images of fish species;

analyzing the underwater visual video footage, wherein the underwater visual video footage is analyzed for fish species identification;

segmenting the underwater visual video footage, wherein the underwater visual video footage is segmented into frames at a frequency of five to ten frames per second;

annotating each frame of the underwater visual video footage, wherein the frames are annotated for fish species and baitfish types;

establishing a database, wherein the database is created from the underwater visual video footage and has fish species identification stored therein;

mounting a camera assembly to the marine vessel, wherein the camera assembly is mounted to the marine vessel utilizing a camera mount, wherein the camera mount includes a portion configured to be journaled into a rod holder of the marine vessel, said camera mount having operably coupled thereto a controller and a cable spool, said cable spool having a video cable operably coupled to the camera assembly;

deploying the camera assembly into water behind the marine vessel, wherein the camera assembly includes a camera operably coupled to a housing;

towing the camera assembly behind the vessel;

capturing a video data, wherein the camera is employed to capture video feed of the area of water behind the vessel;

segmenting the video data into a grid structure, wherein the video data from the camera is segmented into a grid structure;

eliminating baitfish and baitfish rigs from the video data, wherein the baitfish and baitfish rigs present in the video data from the camera is eliminated;

identifying a presence of at least one fish, wherein the at least one fish is captured in the video data from the camera assembly;

surrounding the at least one fish with bounding boxes, wherein in the video data from the camera the at least one fish is surrounded with bounding boxes;

comparing the video data of the at least one fish to the database;

establishing an identity of the at least one fish, wherein the data comparison of the video data with the fish species identification in the database confirms an identity of the at least one fish;

providing a notification to a user of the presence of the at least one fish, wherein the notification provides the confirmation of the identity of the species of the at least one fish in the video data;

tracking the at least one fish, wherein the at least one fish is tracked in the video data.

9. The method of identifying fish behind a marine vessel as recited in claim 8, and further including a step of augmenting the underwater visual video footage, wherein the underwater visual video footage is augmented and optimized prior to storing in the database.

10. The method of identifying fish behind a marine vessel as recited in claim 9, and further including a step of reviewing the video data for accuracy and precision.

11. The method of identifying fish behind a marine vessel as recited in claim 10, wherein the camera housing includes a central portion having a first upper lateral wing member and a second upper lateral wing member, said camera housing further having a first lower lateral wing member and a second lower lateral wing member.

12. The method of identifying fish behind a marine vessel as recited in claim 11, wherein the first upper lateral wing member, second upper lateral wing member is parallel to the first lower lateral wing member and second lower lateral wing member, wherein the first upper lateral wing member, second upper lateral wing and first lower lateral wing member, second lower lateral wing member are angular in orientation.

13. The method of identifying fish behind a marine vessel as recited in claim 12, and further including a step of displaying the video data on a graphical display unit.

14. The method of identifying fish behind a marine vessel as recited in claim 13, and further including a step of updating the database, wherein the database is updated with augmented and optimized video data of fish species.

\* \* \* \* \*